(12) United States Patent
Achi et al.

(10) Patent No.: US 9,841,552 B2
(45) Date of Patent: Dec. 12, 2017

(54) BACKLIGHT DEVICE

(71) Applicant: NICHIA CORPORATION, Anan-shi, Tokushima (JP)

(72) Inventors: Yusaku Achi, Tokushima (JP); Daisuke Iwakura, Komatsushima (JP)

(73) Assignee: NICHIA CORPORATION, Anan-Shi (JP)

( * ) Notice: Subject to any disclaimer, the term of this patent is extended or adjusted under 35 U.S.C. 154(b) by 96 days.

(21) Appl. No.: 14/869,171

(22) Filed: Sep. 29, 2015

(65) Prior Publication Data

US 2016/0091655 A1 Mar. 31, 2016

(30) Foreign Application Priority Data

Sep. 30, 2014 (JP) .................... 2014-199985

(51) Int. Cl.
F21V 8/00 (2006.01)

(52) U.S. Cl.
CPC .......... G02B 6/0068 (2013.01); G02B 6/0023 (2013.01)

(58) Field of Classification Search
CPC ................................................. G02B 6/0068
See application file for complete search history.

(56) References Cited

U.S. PATENT DOCUMENTS

2008/0151527 A1* 6/2008 Ueno .................. C09K 11/584
                                                                  362/84
2010/0053064 A1* 3/2010 Hamada .............. G09G 3/3413
                                                                  345/102
2013/0278650 A1 10/2013 Takahashi et al.

FOREIGN PATENT DOCUMENTS

| JP | 2004-177890 A | 6/2004 |
| JP | 2008-140704 A | 6/2008 |
| JP | 2008-181579 A | 8/2008 |
| WO | WO-2008/065765 A1 | 6/2008 |
| WO | WO-2011/125356 A1 | 10/2011 |
| WO | WO-2012/124509 A1 | 9/2012 |

* cited by examiner

Primary Examiner — David V Bruce
(74) Attorney, Agent, or Firm — Foley & Lardner LLP

(57) ABSTRACT

A backlight device includes a light guide plate having an incident surface, a first side surface, and a second side surface. The first side surface extends from a first end of the incident surface and the second side surface extends from a second end of the incident surface. A green illuminant faces the incident surface and emits a green light toward the incident surface. A red illuminant faces the incident surface and emits a red light toward the incident surface. A white illuminant disposed on a side of at least one end of the first and second ends of the incident surface emits a white light toward the light guide plate. At least one of the emitted green light and the emitted red light includes a blue component having an emission peak wavelength in a range of 420 to 500 nm.

15 Claims, 10 Drawing Sheets

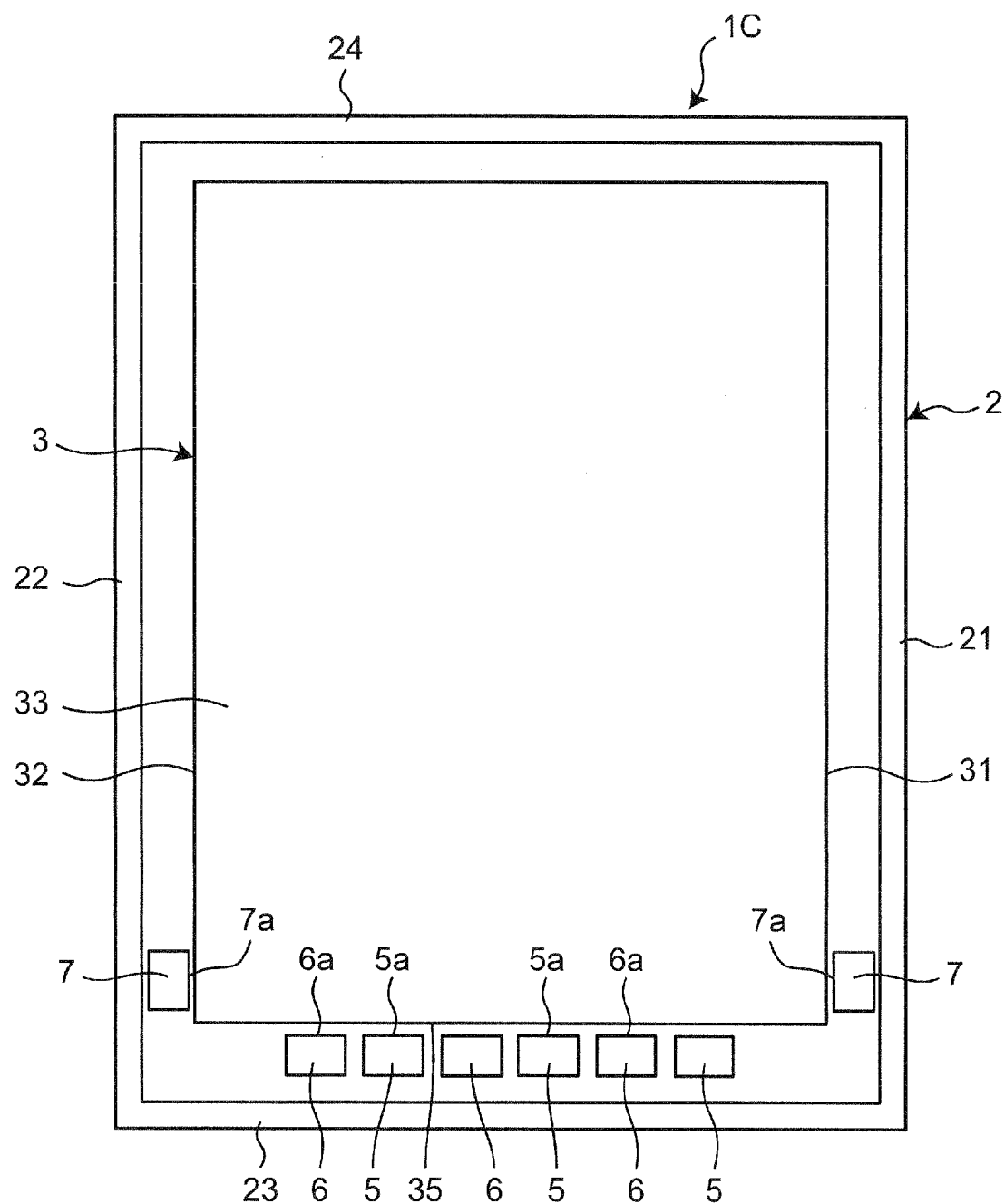

BACKLIGHT DEVICE

CROSS-REFERENCE TO RELATED PATENT APPLICATION

The present application claims priority to Japanese Patent Application No. 2014-199985, filed on Sep. 30, 2014, the content of which is incorporated herein by reference in its entirety.

TECHNICAL FIELD

The present disclosure relates to a backlight device.

BACKGROUND

A conventional backlight device, such as one disclosed in International Patent Application Publication No. WO 2011/125356 A, includes a light guide plate with first and second side surfaces opposed to each other. A first illuminant is positioned closest to the first side surface, and a second illuminant is positioned closest to the second side surface.

Light emitted from the first illuminant and light emitted from the second illuminant are not mixed on respective sides of the first and second side surfaces of the light guide plate, forming a region irradiated with only a single light from each illuminant. While a mixed colored light, which is a mix of light emitted from the first illuminant and light emitted from the second illuminant, is emitted from the central part of the light guide plate, a light having a different color than the mixed colored light is emitted from the side of the first side surface.

Likewise, a light emitted from the side of the second side surface of the light guide plate is a different color than the mixed colored light emitted from the central part of the light guide plate.

Thus, in the conventional backlight device, color unevenness occurs on the respective sides of the first and second side surfaces at the emission surface of the light guide plate.

SUMMARY

Accordingly, it is an object of certain embodiments of the present invention to provide a backlight device that can suppress color unevenness on the sides of the first and second side surfaces extending from ends of an incident surface of a light guide plate.

In order to solve the foregoing problems, a backlight device according to one embodiment of the present invention includes a light guide plate having an incident surface, a first side surface, and a second side surface. The first side surface extends from a first end of the incident surface and the second side surface extends from a second end of the incident surface. A green illuminant is disposed facing the incident surface and configured to emit a green light toward the incident surface. A red illuminant is disposed facing the incident surface and configured to emit a red light toward the incident surface. A white illuminant is disposed on a side of at least one end of both ends of the incident surface and configured to emit a white light toward the light guide plate. At least one of the green light emitted from the green illuminant and the red light emitted from the red illuminant includes a blue component having an emission peak wavelength in a range of 420 to 500 nm.

Accordingly, the backlight device in certain embodiments of the present invention can suppress color unevenness on the sides of the first and second side surfaces extending from the first and second ends of the incident surface of the light guide plate.

BRIEF DESCRIPTION OF THE DRAWINGS

FIG. 10 is a schematic plan view showing a backlight device according to a fourth embodiment of the present invention.

DETAILED DESCRIPTION OF THE INVENTION

Embodiments of the present invention will be described in detail below with reference to FIGS. 1 to 10.

First Embodiment

Figure 1:
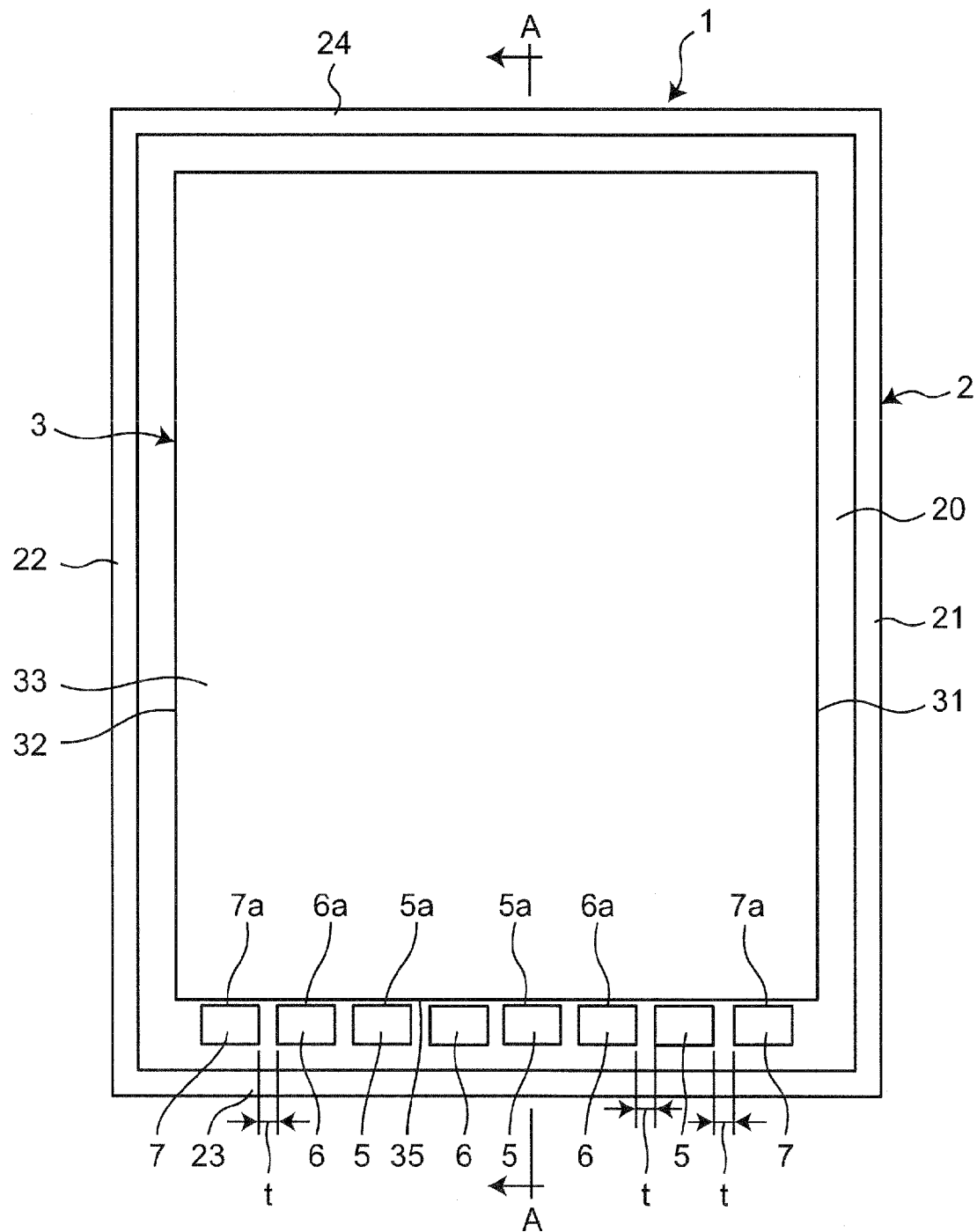
FIG. 1 shows a schematic plan view of a backlight device according to a first embodiment of the present invention.
Figure 2:
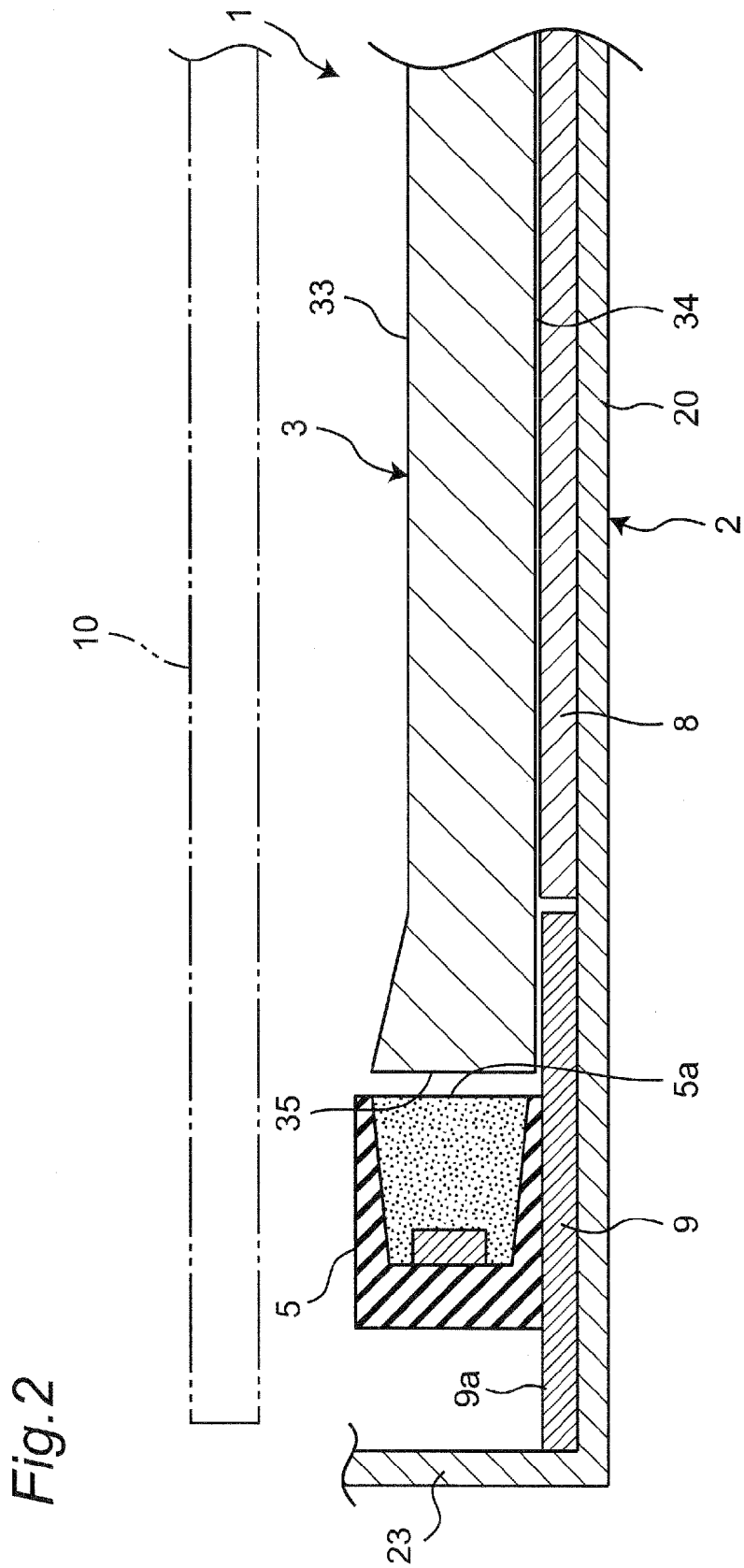
FIG. 2 is a cross-sectional view taken along the line A-A in FIG. 1.

FIG. 1 shows a schematic plan view of a backlight device according to a first embodiment of the present invention. FIG. 2 is a cross-sectional view taken along the line A-A in FIG. 1. As shown in FIGS. 1 and 2, a backlight device 1 includes a case 2, a light guide plate 3 disposed in the case 2, and green illuminants 5, red illuminants 6, and white illuminants 7 that are disposed in the case 2 and configured to emit light toward the light guide plate 3. In the backlight device 1, light emitted from each of the green illuminants 5, the red illuminants 6, and the white illuminants 7 are applied to a liquid crystal panel 10 via the light guide plate 3.

The backlight device 1 in this embodiment can be applied, for example, to portable terminal devices, such as a smart phone or a tablet, and electronic devices, such as a TV or a computer.

The case 2 has a first sidewall 21 and a second sidewall 22 opposed to each other, and a third sidewall 23 and a fourth sidewall 24 opposed to each other. The first sidewall 21, the third sidewall 23, the second sidewall 22, and the fourth sidewall 24 are connected to each other in this order.

The inner surface of the first sidewall 21 and the inner surface of the second sidewall 22 are formed in a white color.

The light guide plate 3 has a first side surface 31, a second side surface 32, an emission surface 33, and an incident surface 35. The light guide plate 3 is formed by a plate member having a substantially rectangular shape in the planar view. The emission surface 33 corresponds to a main surface of the plate member. The incident surface 35 corresponds to one side surface of the plate member. The first side surface 31 corresponds to one side surface of the plate member extending from a first edge of the incident surface 35. The second side surface 32 corresponds to the other side surface of the plate member extending from a second edge of the incident surface 35. The light guide plate 3 is accommodated in the case 2 such that the first side surface 31 faces the first sidewall 21, the second side surface 32 faces the second sidewall 22, and the incident surface 35 faces the third sidewall 23.

Referring to FIG. 1, a plurality of green illuminants 5 and red illuminants 6 are provided. The green and red illuminants 5 and 6 are alternately arranged along the incident surface 35 (note that the illuminants may not be alternately arranged, and alternatively, for example, adjacent illuminants may be of the same type). The green illuminant 5 emits green light toward the incident surface 35, and the red illuminant 6 emits red light toward the incident surface 35. At this time, the optical axis of outgoing light from each of the green illuminant 5 and the red illuminant 6 is substantially perpendicular to the incident surface 35. At least one of the green light emitted from the green illuminant 5 and the red light emitted from the red illuminant 6 includes a blue spectrum (hereinafter referred to as a blue component) having an emission peak wavelength in a range of 420 to 500 nanometers (nm). Although both the green illuminant 5 and the red illuminant 6 include the blue component as mentioned below, the present invention is not limited thereto, and at least one of the green light emitted from the green illuminant 5 and the red light emitted from the red illuminant 6 may include the blue component.

The white illuminant 7 is disposed on the side of at least one of both ends of the incident surface 35. An emission surface 7a of the white illuminant 7 is disposed facing the light guide plate 3, and emits white light toward the light guide plate 3. Preferably, the emission surface 7a of the white illuminant 7 is disposed facing the incident surface 35, and emits the white light toward the incident surface 35. As shown in FIG. 1, the white illuminants 7 are preferably disposed at both ends of the incident surface 35. That is, two white illuminants 7 are positioned at both ends of the incident surface 35 with the green illuminants 5 and the red illuminants 6 sandwiched therebetween. Note that another white illuminant 7 may be disposed between the green illuminant 5 and the red illuminant 6. The optical axis of the outgoing light from the white illuminant 7 is substantially perpendicular to the light guide plate 3, and preferably substantially perpendicular to the incident surface 35.

Figure 7:
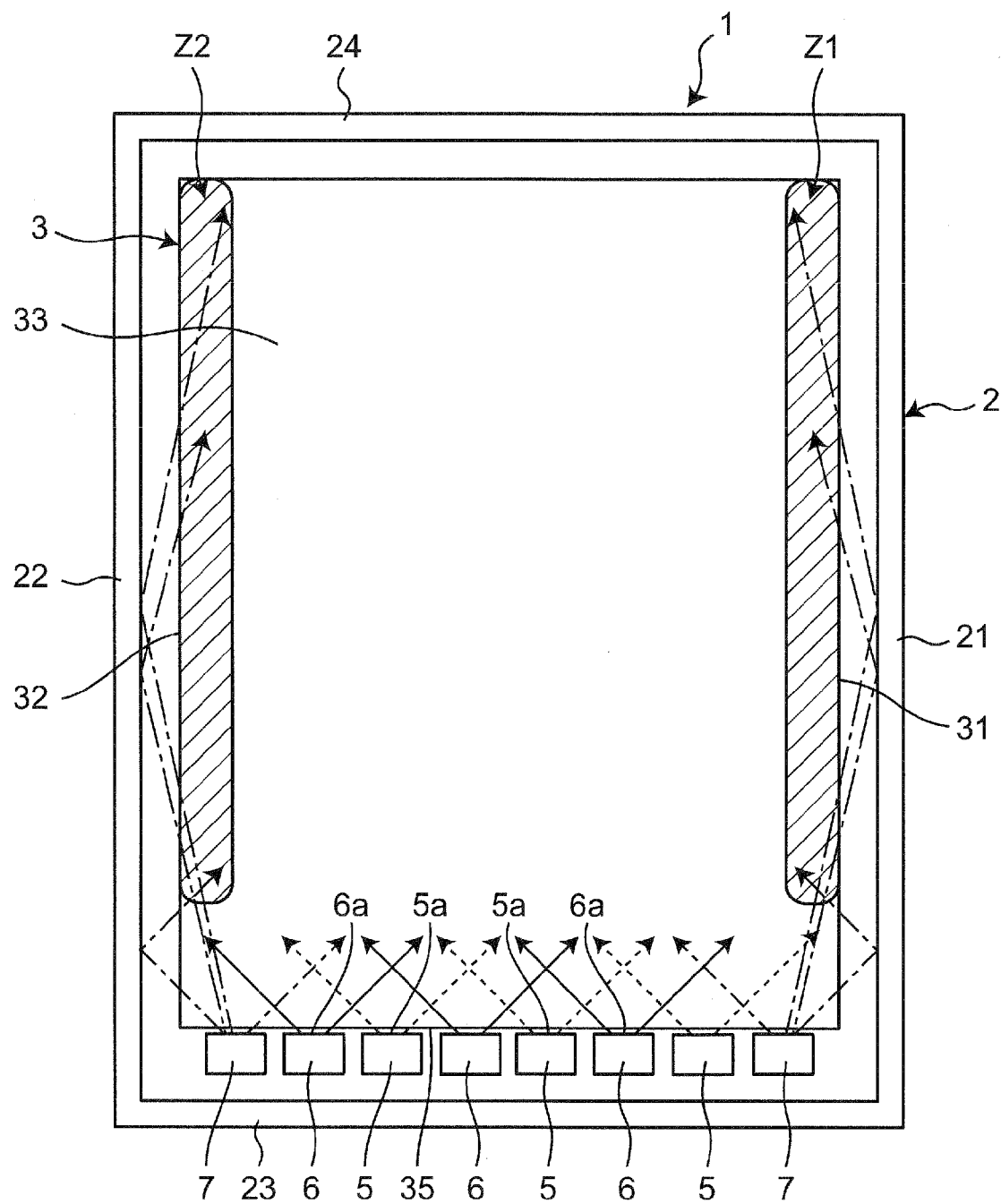
FIG. 7 is a diagram showing an action of the backlight device as viewed from above in the first embodiment of the present invention.

FIG. 7 is a diagram showing the action of the backlight device 1.

Referring to FIG. 7, the green illuminants 5, the red illuminants 6, and the white illuminants 7 emit light toward the incident surface 35. The light from the green illuminants 5 (indicated by dotted arrows in the figure), the light from the red illuminants 6 (indicated by solid arrows in the figure), and the light from the white illuminants 7 (indicated by alternate long and short dashed arrows in the figure) have predetermined directivity angles.

The light from the green illuminants 5 and the light from the red illuminants 6 are mixed together within the light guide plate 3. The green light emitted from the green illuminant 5 and the red light emitted from the red illuminant 6 include the blue component, whereby the light from the green illuminant 5 and the light from the red illuminant 6 are mixed together into white light.

Part of the light emitted from the white illuminant 7 located on the side of the first side surface 31 propagates from the first side surface 31 to the inner surface of the first sidewall 21 of the case 2. Because the color of the inner surface of the first sidewall 21 is set white, the light reflected by the first sidewall 21 maintains the color of the light emitted from the white illuminant 7, that is, the reflected light remains white. The light reflected from the first sidewall 21 re-enters the light guide plate 3 through the first side surface 31. Then, in a first region Z1 on the side of the first side surface 31 of the light guide plate 3, the color of the light is still white. Another part of the light emitted from the white illuminant 7 directly hits a reflective sheet 8 disposed at a backside 34 of the light guide plate 3 to be emitted from the first region Z1. At this time, a white light is still emitted from the first region Z1.

Likewise, the light emitted from the white illuminant 7 located on the side of the second side surface 32 also remains white in a second region Z2 of the light guide plate 3 on the side of the second side surface 32.

Accordingly, this embodiment can suppress the color unevenness on the respective sides of the first and second side surfaces 31 and 32 sequentially extending from both ends of the incident surface 35 of the light guide plate 3.

Here, as the directivity angle of the light from the white illuminant 7 is increased, the first and second regions Z1 and Z2 may be expanded to be closer to the incident surface 35 of the light guide plate 3, which can suppress the light unevenness.

The directivity angle of the light from the white illuminant 7 is preferably equal to or greater than that of the light from each of the green illuminant 5 and the red illuminant 6. In this way, for example, the light directed toward the first sidewall 21 from the green or red illuminant 5 or 6 positioned on the side of the first side surface 31 can be mixed on the side of the first side surface 31 of the light guide plate 3 with the white light emitted from the white illuminant 7 positioned on the side of the first side surface 31. As a result, the color unevenness on the side of the first side surface 31 of the light guide plate 3 can be suppressed. The same goes for the side of the second side surface 32.

The preferred embodiments of the backlight device 1 according to this embodiment will be described below.

Case 2

The case 2 is formed, for example, of resin. As shown in FIGS. 1 and 2, the case 2 includes a bottom wall 20, and the first sidewall 21, the second sidewall 22, the third sidewall 23, and the fourth sidewall 24, which are integrally provided with and around the upper surface of the bottom wall 20. The bottom wall 20 is formed to have a substantially rectangular shape in the planar view. Referring to FIG. 1, the first sidewall 21 is positioned on the right side, the second sidewall 22 is positioned on the left side, the third sidewall 23 is positioned on the lower side, and the fourth sidewall 24 is positioned on the upper side. The first to fourth sidewalls 21 to 24 are connected together.

Light Guide Plate 3

The light guide plate 3 is formed, for example, of acrylic resin, polycarbonate resin, etc. The light guide plate 3 is formed to have a substantially rectangular shape in the planar view. The emission surface 33 is provided at the upper surface of the light guide plate 3, and the backside 34 corresponds to a surface opposite to the emission surface 33 of the light guide plate 3. The incident surface 35 corresponds to a first short side of the rectangular shape of the light guide plate 3 in the planar view. The first side surface 31 corresponds to a first long side of the rectangular shape of the light guide plate 3. The second side surface 32 corresponds to a second long side of the rectangular shape of the light guide plate 3. Note that the incident surface 35 may be located on the long side, and the first and second side surfaces 31 and 32 may be located on the short side.

Green Illuminant 5, Red Illuminant 6, White Illuminant 7

Referring to FIG. 1, there are three green illuminants 5 and three red illuminants 6 (note that the number of the green or red illuminants is not limited to three, and may be more or less than three). The green and red illuminants 5 and 6 are alternately arranged along the incident surface 35 (but they are not necessarily arranged alternately, and may be arranged, for example, such that the adjacent illuminants are of the same type). As shown in FIG. 1, the green illuminant 5 is disposed at a position closer to the first side surface 31 than the red illuminant 6, while the red illuminant 6 is disposed at a position closer to the second side surface 32 than the green illuminant 5. An emission surface 5a of the green illuminant 5 and an emission surface 6a of the red illuminant 6 face the incident surface 35. Note that the red illuminant 6 may be disposed in a position closer to the first side surface 31 than the green illuminant 5, while the green illuminant 5 may be disposed in the position closer to the second side surface 32 than the red illuminant 6. Alternatively, two green illuminants 5 may be adjacent to each other, or two red illuminants 6 may be adjacent to each other.

Referring to FIG. 1, two white illuminants 7 are disposed (note that the number of white illuminants 7 may be more than two, or alternatively less than two). The two white illuminants 7 sandwich therebetween three green illuminants 5 and three red illuminants 6. That is, one of the white illuminants 7 is disposed in a position closest to the first side surface 31, while the other white illuminant 7 is disposed in a position closest to the second side surface 32.

The green illuminants 5, the red illuminants 6, and the white illuminants 7 are arranged at intervals of "t" from each other along the incident surface 35. The interval t is preferably in a range of 1.3 mm to 3.5 mm. Specifically, the interval t between adjacent illuminants of the green, red, and white illuminants 5, 6, and 7 is preferably in a range of 1.3 mm to 3.5 mm, for example, when the width of the illuminant facing the incident surface 35 is in a range of 1.5 mm to 2.0 mm. With such arrangement, the light emitted from adjacent illuminants can be effectively mixed, thereby providing the backlight device 1 with less color unevenness.

Note that the numbers of the green illuminants 5, the red illuminants 6, and the white illuminants 7 are selectively determined taking into consideration an emission intensity ratio between the green, red, and white illuminants 5, 6, and 7. The detailed structures of the green, red, and white illuminants 5, 6, and 7 will be mentioned later.

Substrate 9

The green illuminants 5, the red illuminants 6, and the white illuminants 7 are mounted on an upper surface 9a of a substrate 9. The substrate 9 may be a normal printed board, or a flexible substrate including a conductive wiring printed on a substrate made of an insulating resin may be used. For example, the substrate 9 can be preferably formed by a glass epoxy substrate with a conductive pattern of a copper foil, etc., applied thereto, or by a metal body or the like coupled to an insulating resin. Alternatively, the substrate 9 may be a substrate with a high heat dissipation property that is formed by applying a conductive wiring onto a metal material, such as aluminum or copper, via an insulating material. In particular, the flexible substrate is more preferable as it can be flexibly arranged on a surface of a bent metal frame, or along a through-hole or a cutout portion formed in a metal frame, thereby facilitating the assembly of a backlight unit. The green illuminants 5, the red illuminants 6, and the white illuminants 7 are electrically connected to wirings on the upper surface 9a of the substrate 9.

The substrate 9 is formed in a rectangular shape with long and short sides in the planar view. The long side of the substrate 9 is set to have substantially the same length as that of the incident surface 35 of the light guide plate 3. As shown in FIG. 2, the substrate 9 is disposed between the backside 34 of the light guide plate 3 and the upper surface of the bottom wall 20 of the case 2. That is, the substrate 9 overlaps with the light guide plate 3, specifically, with the end of the light guide plate 3 on the side of the incident surface 35.

Reflective Sheet 8

As shown in FIG. 2, the reflective sheet 8 is disposed between the backside 34 of the light guide plate 3 and the upper surface of the bottom wall 20 of the case 2. The reflective sheet 8 overlaps with substantially the entire region of the light guide plate 3 except for the end on the incident surface 35 side of the light guide plate 3. That is, the reflective sheet 8 does not overlap with the substrate 9. The reflective sheet 8 reflects light leaking from the backside 34 of the light guide plate 3 toward the light guide plate 3. A liquid crystal panel 10 is disposed facing the emission surface 33 of the light guide plate 3. Optical sheets, including a diffusion sheet, a prism sheet, a polarizing sheet, and the like, are disposed between the liquid crystal panel 10 and the emission surface 33. The light emitted from the emission surface 33 of the light guide plate 3 is applied to the liquid crystal panel 10 through the optical sheets.

Green Illuminant 5

Figure 3A:
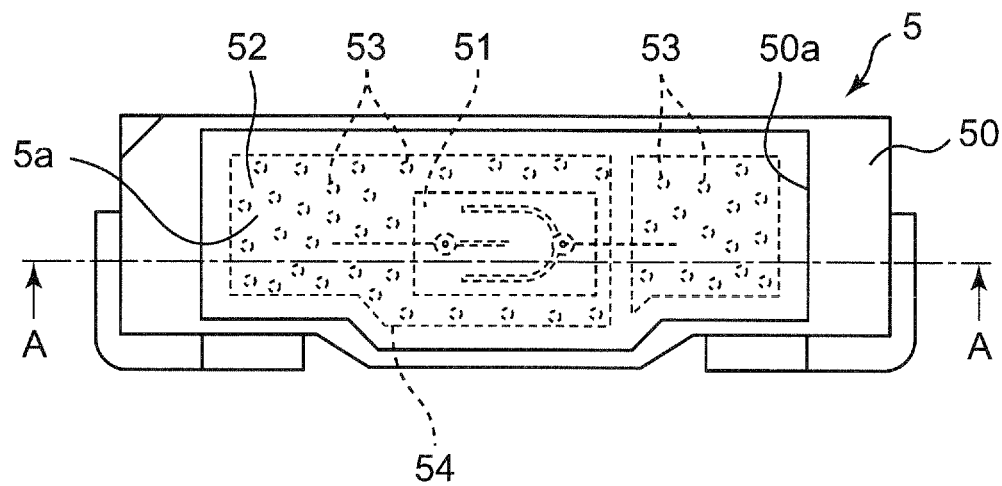
FIG. 3A is a schematic front view of the backlight device as viewed from an emission surface side of a green illuminant in the first embodiment of the present invention.
Figure 3B:
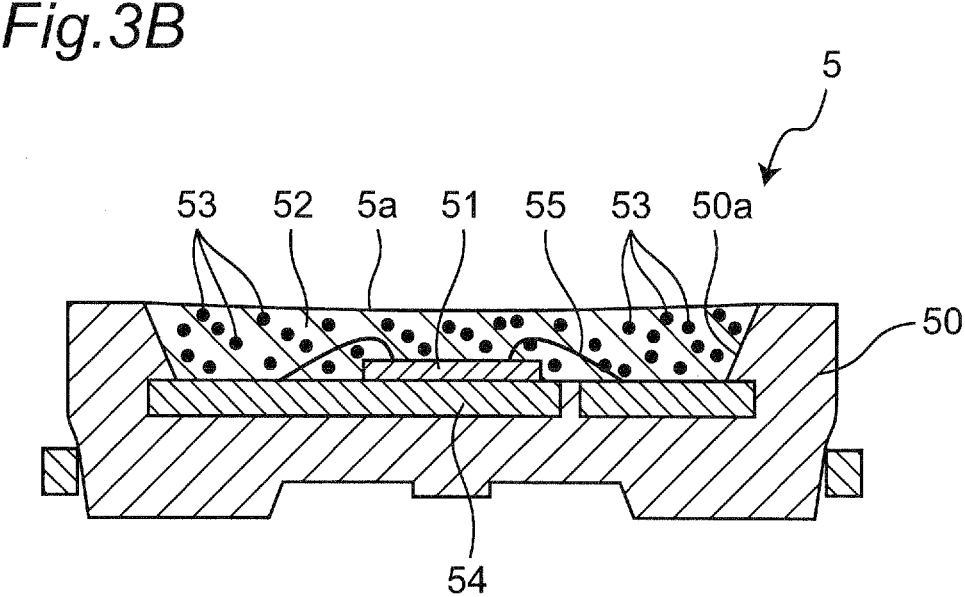
FIG. 3B is a cross-sectional view taken along the line A-A in FIG. 3A.

FIG. 3A is a schematic front view of the green illuminant 5 as viewed from the side of the emission surface 5a. FIG. 3B is a cross-sectional view taken along the line A-A in FIG. 3A. As shown in FIGS. 3A and 3B, the green illuminant 5 includes at least a package 50, a light emitting element 51, a sealing resin 52, and green phosphors 53. The green illuminant 5 emits a green light that satisfies a region specified in a CIE chromaticity diagram as follows: $0<x<0.4$ and $0.05<y<0.9$, and, preferably, $0.1<x<0.3$ and $0.4<y<0.6$.

The package 50 has a concave portion 50a. A lead frame 54 is disposed at the bottom of the concave portion 50a. The package 50 and the lead frame 54 are integrally formed. The package 50 can be formed, for example, using a thermoplastic resin, such as polyphthalamide (PPA), polyphenylene sulfide (PPS), a liquid crystal polymer, or nylon, and a thermosetting resin, such as an epoxy resin, a silicone resin, a modified epoxy resin, a modified silicone resin, an unsaturated polyester resin, an urethane resin, an acrylic resin, a glass epoxy resin, ceramic, glass, and the like. Note that as the ceramic, particularly, alumina, aluminum nitride, mullite, silicon carbide, or silicon nitride are preferably used. The lead frame 54 is formed of a metal, for example, iron, copper, a copper-iron alloy, a copper-tin alloy, or aluminum, iron, copper plated with copper, gold, or silver, and the like.

The directivity angle of light emitted from the package 50 can be adjusted or controlled by adjusting an angle of the inner sidewall of the concave portion 50a, or by setting a lens of any appropriate shape by forming the lens by the sealing resin 52 or another member as mentioned later.

Figure 4:
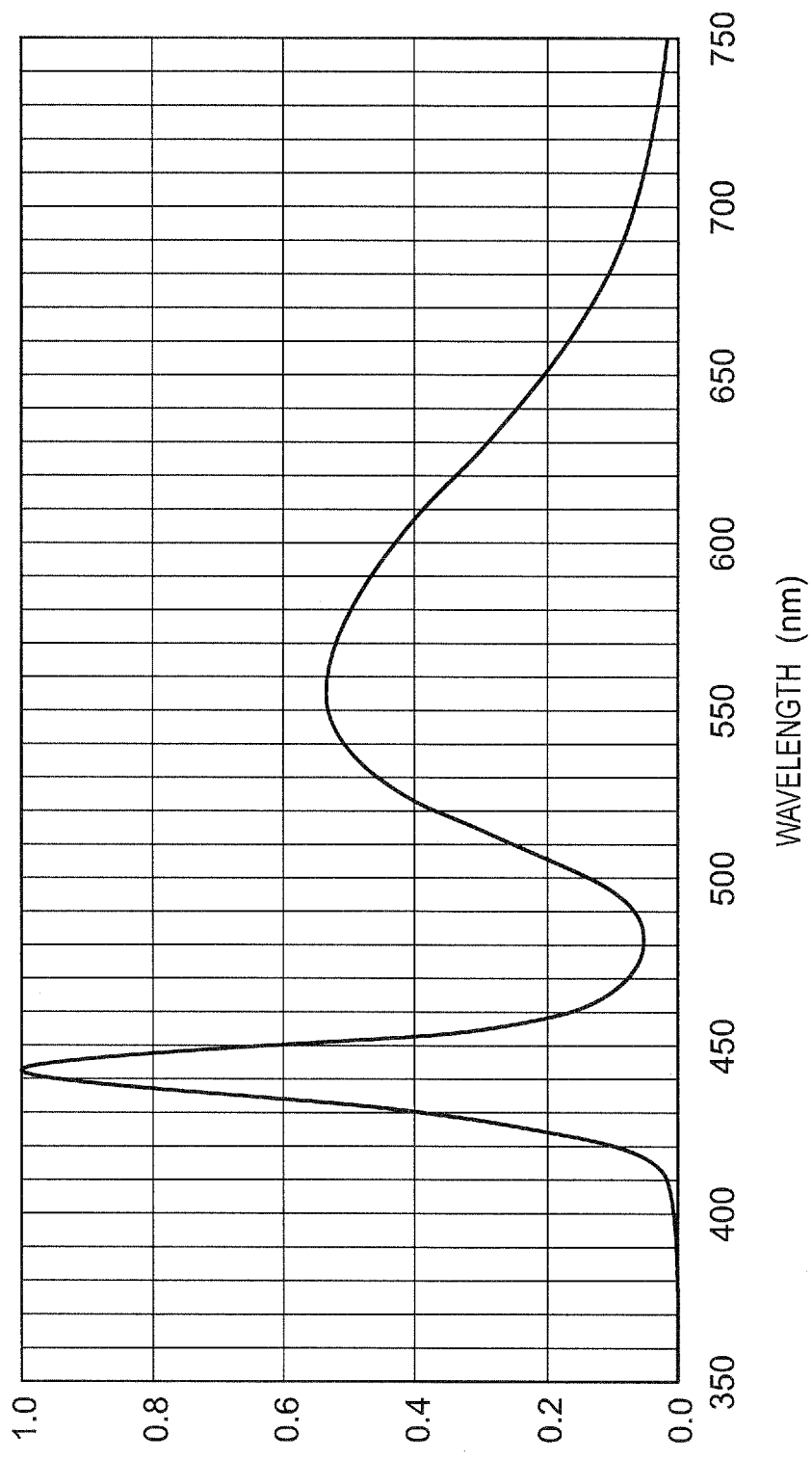
FIG. 4 is a diagram showing an emission spectrum including a red component and a blue component.

Either the green light emitted from the green illuminant 5 or the red light emitted from the red illuminant 6 to be mentioned below contains the blue component. For example, FIG. 4 shows a diagram of an emission spectrum including a red component and a blue component. The blue component as used herein may mean a blue light emitted from a blue light emitting element to be mentioned later. Alternatively, in another embodiment, the blue component may mean a blue light emitted from a blue phosphor when being excited by a light emitting element (e.g., ultraviolet light emitting element).

The light emitting element 51 is disposed within the concave portion 50a of the package 50. The light emitting element 51 is attached to the lead frame 54. The light emitting element 51 is electrically connected to the lead frame 54 via wires 55. The light emitting element 51 is a blue light emitting element that emits blue light. The blue light emitting element is preferably, for example, a nitride semiconductor-based light emitting element ($In_xAl_yGa_{1-x-y}N$, $0 \leq x$, $0 \leq y$, $x+y \leq 1$). A light emitting element having an emission peak wavelength in a range of 420 to 500 nm is preferably used as the blue light emitting element. Note that the light emitting element 51 may be an ultraviolet light emitting element other than the blue light emitting element. In employing an ultraviolet light emitting element, the ultraviolet light emitting element having an emission peak wavelength in a range from 200 to less than 420 nm, especially, from 250 to 380 nm can be used to effectively excite the phosphors, including the red phosphor, the blue phosphor, and the green phosphor, thereby mixing the respective lights together to emit a white light therefrom.

The sealing resin 52 is disposed within the concave portion 50a of the package 50 to seal the light emitting element 51. The sealing resin 52 is formed of a translucent resin. Suitable translucent resins are resins having good weatherability, which can include, for example, a silicone resin, an epoxy resin, a urea resin, a fluororesin, and a hybrid resin containing at least one of these resins. In addition to the resins, inorganic materials having good light resistance, such as glass or silica, can also be used. To impart a predetermined function to the sealing resin 52, the sealing resin 52 can be made by blending at least one of an element selected from the group consisting of a filler, a diffusing agent, a pigment, a phosphor material, and a reflective material therein. A sealing member may also contain a diffusing agent. Specifically, suitable examples of the diffusing agent include barium titanate, titanium oxide, aluminum oxide, silicon oxide, and the like. The sealing member can also contain an organic or inorganic coloring dye or coloring pigment for the purpose of cutting undesired wavelengths. Further, the sealing member can also contain a phosphor material that absorbs light from the light emitting element 51 to convert the wavelength of the light.

The green phosphor 53 is a granular phosphor and is contained in the sealing resin 52. The green phosphor 53 is excited by at least part of the light emitted from the light emitting element 51 to generate green light. The green phosphors 53 suitable for use can include, for example, at least one phosphor selected from a chlorosilicate-based phosphor, such as $Ca_8MgSi_4O_{16}Cl_2$: Eu, a β-type sialon-based phosphor, such as $Si_{6-z}Al_zO_zN_{8-z}$: Eu, a LAG-based phosphor (yellow phosphor material) containing a mixture of lutetium, aluminum, and garnet. Further, an oxynitride phosphor mainly activated by lanthanoid-based elements, such as Eu or Ce, can also be used as a phosphor.

Figure 5A:
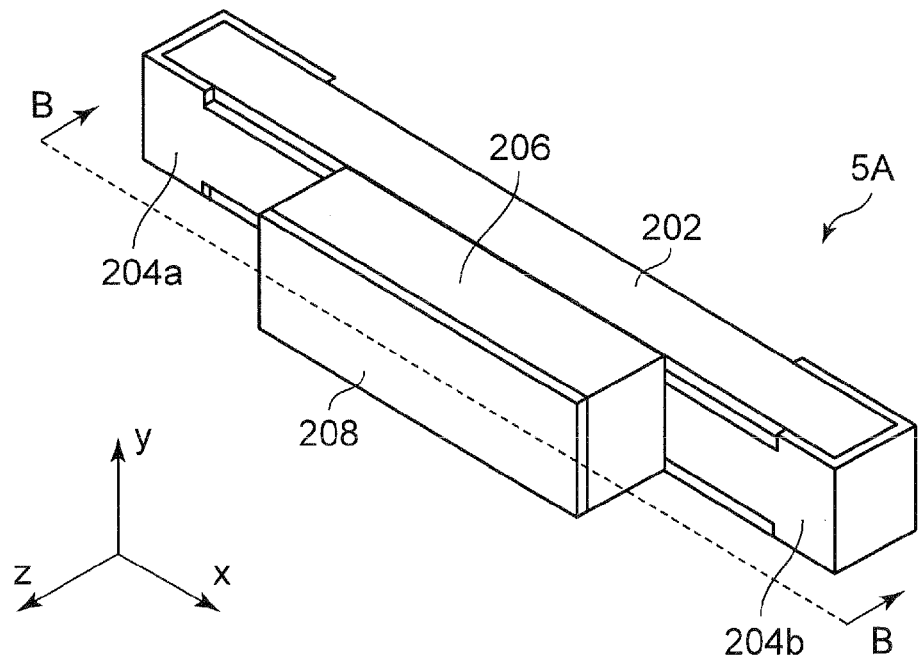
FIG. 5A is a perspective view of another form of the green illuminant in the backlight device in the first embodiment of the present invention.
Figure 5B:
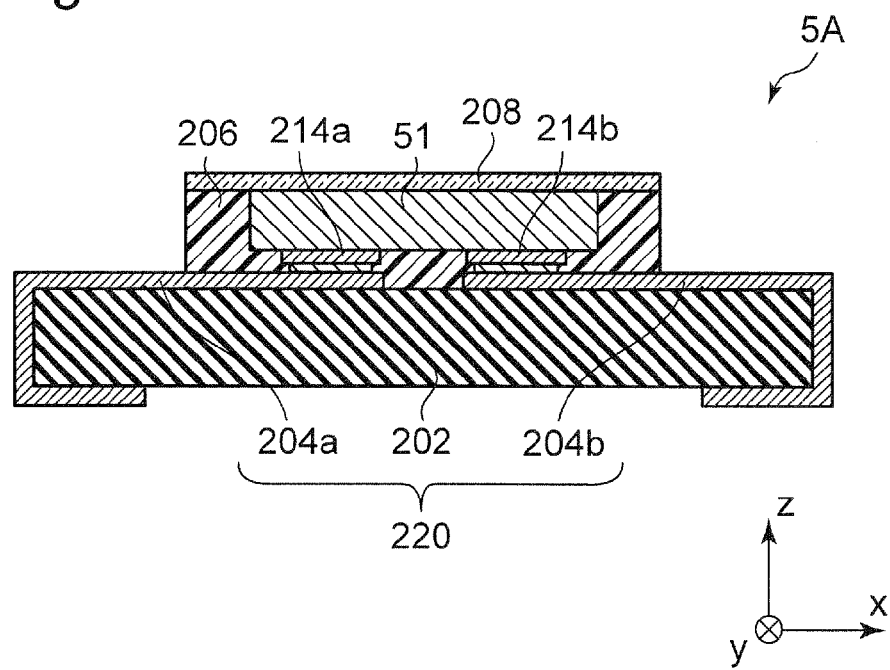
FIG. 5B is a cross-sectional view taken along the line B-B in FIG. 5A.

As shown in FIGS. 5A and 5B, a green illuminant 5A in another embodiment does not have the concave portion 50a shown in FIGS. 3A and 3B. The green illuminant 5A includes a base substrate 220 having an insulator 202 and external connection terminals 204a and 204b, the light emitting element 51 mounted on the base substrate 220, a light-blocking member 206 covering the sidewalls of the light emitting element 51, and a phosphor layer 208 covering at least the emission surface of the light emitting element 51. The light emitting element 51 is electrically connected to the external connection terminals 204a and 204b via electrodes 214a and 214b of the light emitting element 51.

Such a green illuminant 5A does not have the concave portion 50a shown in FIGS. 3A and 3B, so that the width of the light emitting element 51 (the width thereof in the Y direction shown in FIG. 5A) can approach the thickness of the green illuminant 5A (the thickness thereof in the Y direction shown in FIG. 5A). Thus, the light emitting element 51 of the green illuminant 5A can be made larger than the light emitting element 51 of the green illuminant 5 with the concave portion 50a, resulting in an increase in luminous flux of the green illuminant 5A.

Figure 6:
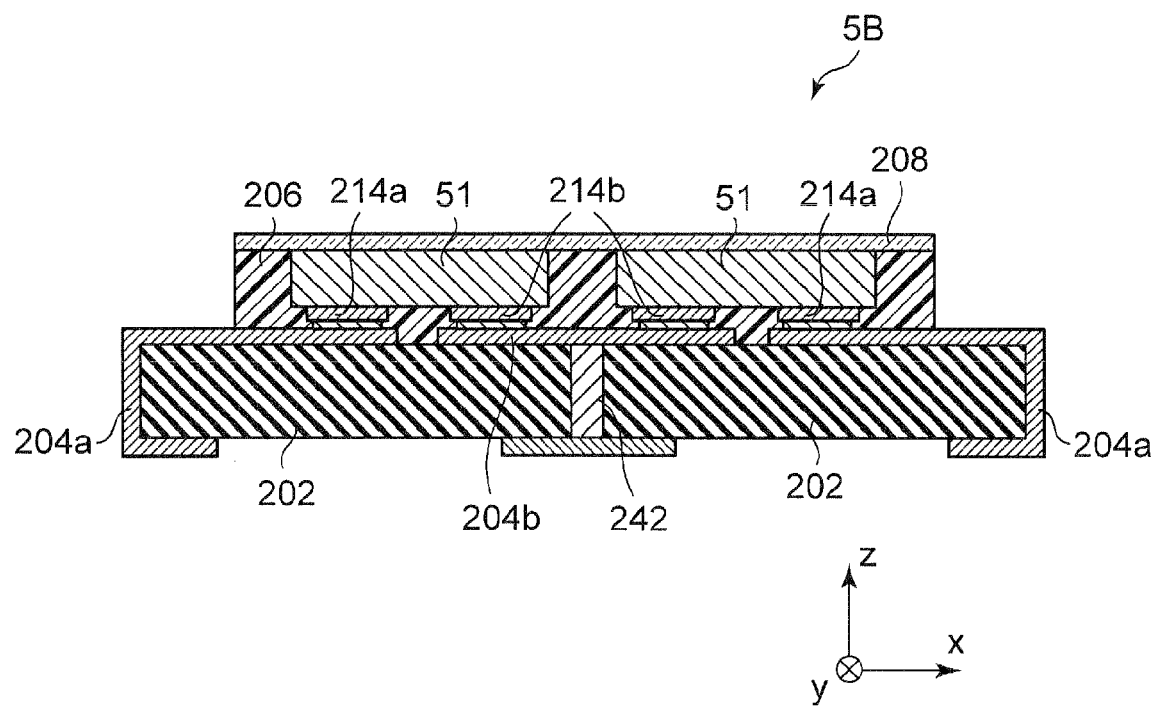
FIG. 6 is a cross-sectional view of another form of the green illuminant in the backlight device in the first embodiment of the present invention.

FIG. 6 shows a green illuminant 5B in a further embodiment. In comparison with the green illuminant 5A shown in FIGS. 5A and 5B, the green illuminant 5B differs from the green illuminant 5A in that a plurality of light emitting elements 51 are provided, and a metal body 242 is formed between the two insulators 202 and 202. The plurality of light emitting elements 51 are provided in one green illuminant 5B, which can decrease the width of the green illuminant 5B (width in the X direction shown in FIG. 6), making the region for mounting the green illuminant 5B compact. The metal body 242 is formed between two insulators 202 and 202, allowing heat from the light emitting element 51 to be dissipated to the outside via the metal body 242.

The green illuminants 5A and 5B are suitable for use in a thin backlight device as the thickness (thickness in the Y direction shown in FIGS. 5B and 6) of the green illuminant 5B can be reduced together with the light emitting elements 51.

Red Illuminant 6

The red illuminant 6 includes at least a package, a light emitting element, a sealing resin, and red phosphors. The package, the light emitting element, and the sealing resin of the red illuminant 6 can be made of the same materials and have the same structures as those of the green illuminant 5. The red illuminant 6 emits a red light that satisfies a region specified in a CIE chromaticity diagram, for example, as follows: $0.3<x<0.7$ and $0.1<y<0.4$, and, preferably, $0.4<x<0.6$, and $0.1<y<0.3$.

The red phosphor is a granular phosphor and is contained in the sealing resin. The red phosphor is excited by at least part of the light emitted from the light emitting element to generate red light. A red phosphor suitable for use can be, for example, at least one phosphor selected from a SCASN-based phosphor, such as (Sr, Ca) $AlSiN_3$: Eu, a CASN-based phosphor, such as $CaAlSiN_3$:Eu, $Ca_2Si_5N_8$:Eu, $SrAlSiN_3$: Eu, an α-type-sialon-based phosphor activated by Eu, and a KSF phosphor, such as $K_2SiF_6$:Mn. Further, another phosphor having the same performance, action, and effect as the above phosphors can also be used. The phosphor may be made of a silicate-based phosphor activated by Eu.

White Illuminant 7

The white illuminant 7 includes at least a package, a light emitting element, a sealing resin, and phosphors. The package, the light emitting element, and the sealing resin of the white illuminant can be made of the same materials and have the same structures as those of the green illuminant 5. The white illuminant 7 emits a white light that satisfies a region specified in a CIE chromaticity diagram, for example, as follows: 0.2<x<0.5 and 0.2<y<0.45, and, preferably, 0.25<x<0.45 and 0.25<y<0.4. Note that the phosphor may be, for example, a YAG phosphor, or a combination of the green phosphor and the red phosphor as mentioned above.

When an ultraviolet light emitting element is used in at least one of the green, red, and white illuminants, blue phosphors may be included in one package of the at least one of the green, red, and white illuminants. The blue phosphor suitable for use in this case is a phosphor having an emission peak wavelength of 430 to 460 nm, and is preferably a europium-activated chlorophosphate phosphor having a composition represented by the following formula (1).

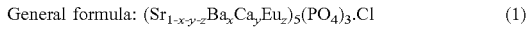

General formula: $(Sr_{1-x-y-z}Ba_xCa_yEu_z)_5(PO_4)_3 \cdot Cl$     (1)

where x, y, and z are values that satisfy the relations: $0 \leq x < 0.5$, $0 \leq y < 0.1$, and $0.005 < z < 0.1$.

The blue phosphor having the composition represented by the formula (1) can produce a blue light with good emission efficiency.

The phosphors (green, red, and blue) mentioned above may have quantum dots. The particulate phosphor may have a long diameter of about 1 nm to about 100 nm and may have quantum, and have discrete energy levels. The energy state of each quantum dot depends on its size. By changing the size of the particles having quantum dots, the emission wavelength can be flexibly selected. The light emitted from the quantum dot has a narrow spectrum width. The light with these sharp peaks are appropriately combined to expand the color gamut. Thus, using phosphors having quantum dots can easily expand the color gamut. Further, phosphors having quantum dots have a high responsiveness to enable effective use of the light from the light emitting element. Additionally, phosphors having quantum dots have a high stability. For example, a compound of a group 12 element and a group 16 element, a compound of a group 13 element and a group 16 element, a compound of a group 14 element and a group 16 element, and the like, specifically, CdSe, CdTe, ZnS, CdS, PbS, PbSe, CdHgTe, etc., can have quantum dots. As a nano-quantum material, a quantum rod and the like can be used, in addition to the quantum dots.

The action of the backlight device 1 will be described below.

As shown in FIG. 7, the three green illuminants 5 and the three red illuminants 6 emit a respective light toward the incident surface 35 of the light guide plate 3. The light emitted from the green illuminants 5 and the red illuminants 6 propagate within the light guide plate 3 toward the side opposite to the incident surface 35 of the light guide plate 3 at predetermined directivity angles. Then, the light from the green illuminants 5 and the light from the red illuminants 6 are mixed together within the light guide plate 3 to generate a white light. The white light within the light guide plate 3 is emitted from the emission surface 33 of the light guide plate 3. Note that the white light within the light guide plate 3 is reflected by the backside 34 of the light guide plate 3 and the reflective sheet 8 facing the backside 34, and then emitted from the emission surface 33.

As shown in FIG. 7, the white illuminants 7 emit light toward the incident surface 35. As mentioned above, part of the light from each white illuminant 7 is reflected from the first sidewall 21 and the second sidewall 22 and then enters the light guide plate 3 again while keeping its white color, whereby white lights are emitted from the first and second regions Z1 and Z2. Another part of the light emitted from the white illuminant 7 hits directly on the reflective sheet 8 to be emitted from the first and second regions Z1 and Z2. At this time, the first and second regions Z1 and Z2 allow the respective white lights to be emitted therefrom. Thus, the color unevenness in the first and second regions Z1 and Z2 can be suppressed at the emission surface 33.

Thereafter, as shown in FIG. 2, the light emitted from the emission surface 33 of the light guide plate 3 is applied to the liquid crystal panel 10 via the optical sheets, including the diffusion sheet, the prism sheet, the polarizing sheet, and the like.

In the embodiment mentioned above, the white illuminant 7 is disposed on at least one end side of both ends of the incident surface 35. For example, the white illuminant 7 is disposed closest to the first side surface 31. In this case, the light emitted from the white illuminant 7 and leaking from the first side surface 31 keeps its color white even when hitting the inner surface of the first sidewall 21 to be reflected by the first sidewall 21, and then entering the light guide plate 3 via the first side surface 31. Part of the light emitted from the white illuminant 7 hits directly on the reflective sheet 8 to be emitted from the side of the first side surface 31. Even at this time, from the side of the first side surface 31, a white light is emitted. In this way, the color unevenness on the side of the first side surface 31 of the light guide plate 3 can be suppressed. For example, likewise, when the white illuminant 7 is disposed closest to the second side surface 32, the color unevenness on the side of the second side surface 32 of the light guide plate 3 can be suppressed.

In a modified example of the first embodiment, the optical axis of the white illuminant 7 may be inclined outward by an inclination angle x with respect to the incident surface 35. In this case, the inclination angle x is, for example, in a range of $0° < x \leq 30°$, preferably, $0° < x \leq 20°$, and more preferably $0° < x \leq 10°$. With this arrangement, the region at the first side surface 31 or the second side surface 32 is more likely to be irradiated directly with the light from the white illuminant 7 disposed at the end of the light guide plate, thereby enabling suppression of the occurrence of color unevenness.

Further, in another modified example, an interval t1 between the white illuminant 7 disposed at one end of the incident surface and the green illuminant 5 or red illuminant 6 adjacent to the white illuminant may be larger than an interval t2 between the adjacent green and red illuminants 5 and 6. With this arrangement, in the central region of the emission surface 33, the light from the green and red illuminants 5 and 6 densely arranged at the center of the incident surface 35 are promoted to be mixed together into a mixed color, while in regions on the sides of the first side surface 31 and the second side surface 32 of the emission surface 33, the color of light from the white illuminants 7 becomes dominant, which can suppress the color unevenness at the emission surface 33.

Second Embodiment

Figure 8:
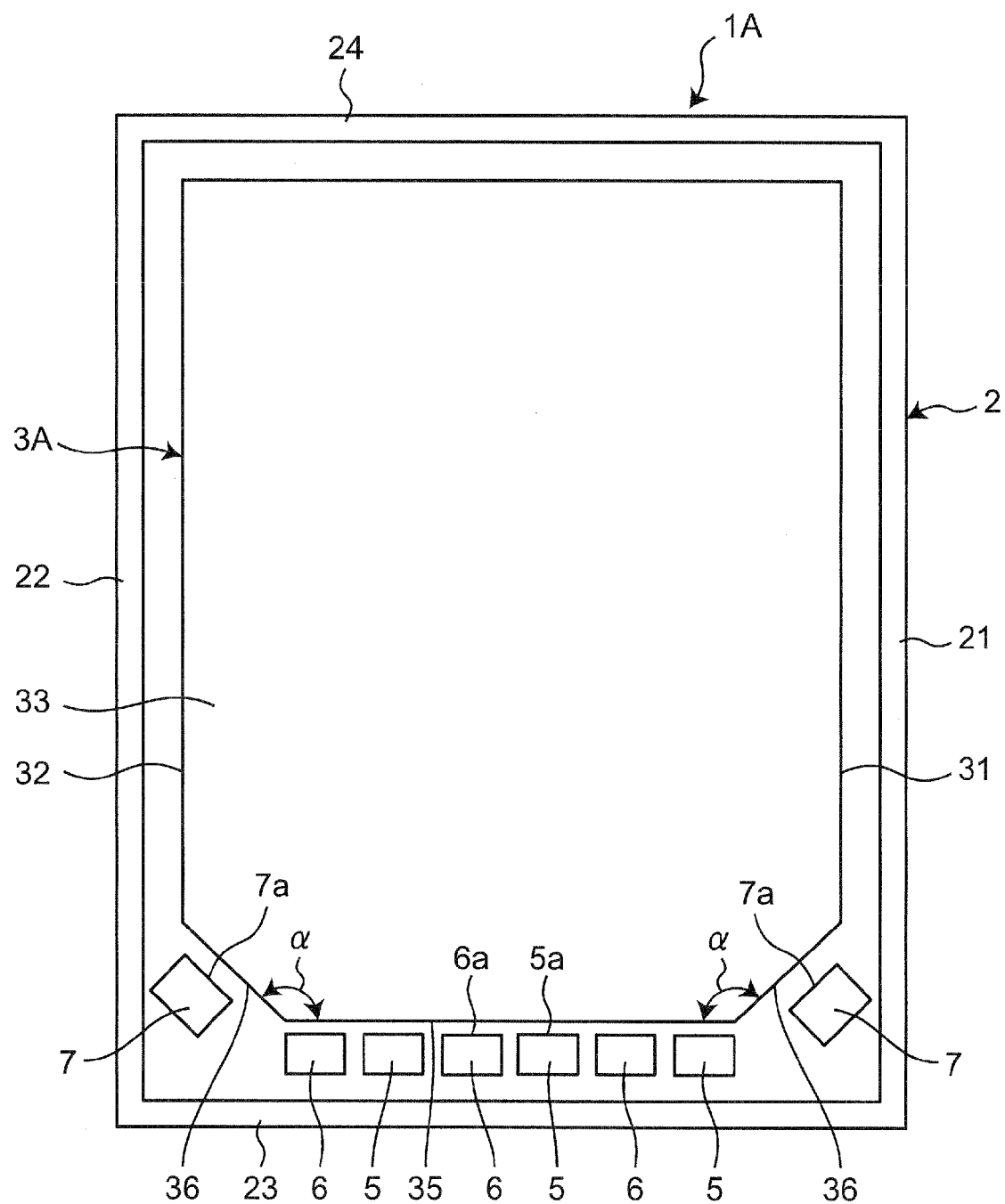
FIG. 8 is a schematic plan view showing a backlight device according to a second embodiment of the present invention.

FIG. 8 shows a schematic plan view of a backlight device according to a second embodiment of the present invention. The second embodiment differs from the first embodiment in the shape of the light guide plate. Only differences in structure will be explained in further detail below. Note that in the second embodiment, the same reference numerals as those in the first embodiment denote the same structures as those of the first embodiment, and thus a description thereof will be omitted below.

As shown in FIG. 8, in a backlight device 1A of the second embodiment, the light guide plate 3A has at least one inclined surface 36 that is inclined at a predetermined inclination angle α with respect to the incident surface 35 in the top view. In this case, the inclined surface may be regarded as a part of the incident surface. Specifically, the incident surface 35 may be regarded as a first incident surface and the inclined surface 36 as a second incident surface. The inclined surface 36 is preferably provided at both ends of the incident surface 35. The light guide plate 3 has a shape formed by cutting out the edges from the rectangular shape in the planar view. The incident surface 35 corresponds to one side of the rectangular shape, while the inclined surfaces 36 are provided at the edges of the rectangular shape.

The white illuminant 7 is disposed facing the inclined surface 36 on the side of at least one of both ends of the incident surface 35. The white illuminants 7 are preferably disposed at the respective two inclined surfaces 36. With this arrangement, the optical axis of the outgoing light from the white illuminant 7 can be inclined inward. For example, the white illuminant 7 disposed facing the inclined surface 36 on the one end side easily applies the white light to the side surface on the other end side (the second side surface 32 in the case of the white illuminant 7 disposed at the inclined surface 36 on the side of the first side surface 31), and thus can more effectively suppress the color unevenness at the emission surface 33. The outgoing light from the white illuminants 7 can be applied to the vicinity of the ends of the incident surface 35. Thus, the regions in the vicinity of the ends of the incident surface 35 where color unevenness tends to occur can be easily irradiated intensively with the light from the white illuminants 7, which can more surely prevent the occurrence of color unevenness in the vicinity of the ends of the incident surface 35.

Note that the inclination angle α is determined based on the directivity angle of the outgoing light from the white illuminant 7. That is, the inclination angle α is determined such that the optical axis of the outgoing light from the white illuminant 7 approaches inward. As the directivity angle of the outgoing light from the white illuminant 7 is decreased, the inclination angle α becomes smaller.

Third Embodiment

Figure 9:
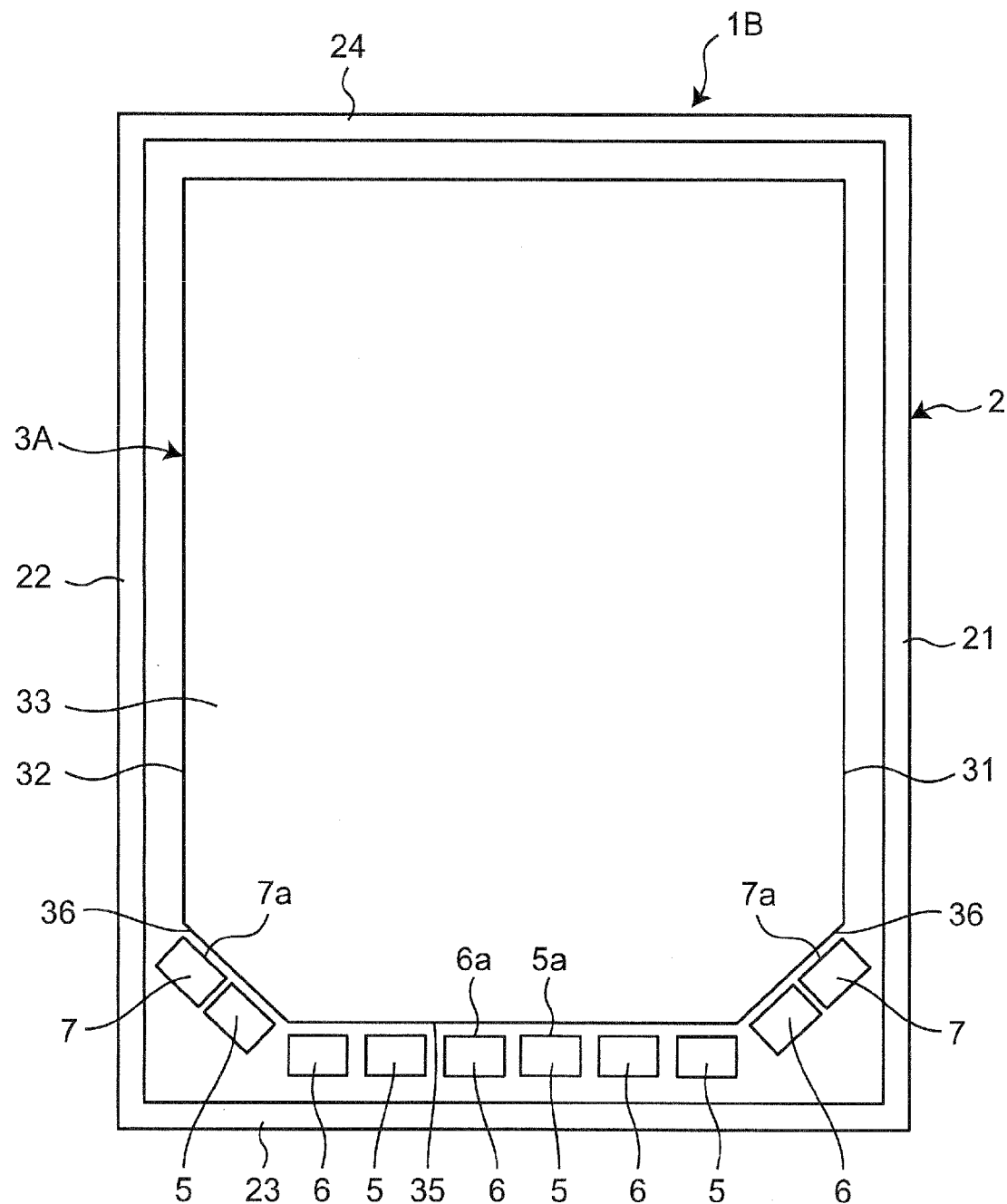
FIG. 9 is a schematic plan view showing a backlight device according to a third embodiment of the present invention.

FIG. 9 shows a schematic plan view of a backlight device according to a third embodiment of the present invention. The third embodiment differs from the second embodiment in the number of illuminants disposed at the inclined surfaces of the light guide plate. Only differences in structure will be explained in further detail below. Note that in the third embodiment, the same reference numerals as those in the second embodiment denote the same structures as those of the second embodiment, and thus a description thereof will be omitted below.

As shown in FIG. 9, in a backlight device 1B of the third embodiment, at least one inclined surface 36 of the light guide plate 3A is provided with the green or red illuminant 5 or 6 and the white illuminant 7 from the side of the incident surface 35 in this order. Specifically, one inclined surface 36 (on the left side in the figure) is provided with the green illuminant 5 and the white illuminant 7 from the side of the incident surface 35 in this order, and the other inclined surface 36 (on the right side in the figure) is provided with the red illuminant 6 and the white illuminant 7 from the side of the incident surface 35 in this order.

In this way, at the inclined surface 36 on the one end side, the optical axis of the green illuminant 5 is inclined inward, so that the outgoing light from the green illuminant 5 tends to be mixed with the outgoing light from the red illuminant 6 to generate the white light, which can more surely suppress the color unevenness on the side of the second side surface 32 of the light guide plate 3. The same goes for the other inclined surface 36, whereby the color unevenness on the side of the first side surface 31 of the light guide plate 3 can be more surely suppressed.

As mentioned in the description of the second embodiment, the white illuminant 7 disposed facing the inclined surface 36 on the one end side easily applies the white light to the side surface on the other end side (the second side surface 32 in the case of the white illuminant 7 disposed at the inclined surface 36 on the side of the first side surface 31), and thus can more effectively suppress the color unevenness at the emission surface 33. The outgoing light from the white illuminants 7 can be applied to the vicinity of the ends of the incident surface 35. Thus, the regions in the vicinity of the ends of the incident surface 35 where color unevenness tends to occur can be easily irradiated intensively with the light from the white illuminants 7, which can more surely prevent the occurrence of color unevenness in the vicinity of the ends of the incident surfaces 35.

Fourth Embodiment

FIG. 10 shows a schematic plan view of a backlight device according to a fourth embodiment of the present invention. The fourth embodiment differs from the first embodiment in arrangement of the white illuminants 7. Only differences in structure will be explained in further detail below. Note that in the fourth embodiment, the same reference numerals as those in the first embodiment denote the same structures as those of the first embodiment, and thus a description thereof will be omitted below.

As shown in FIG. 10, in a backlight device 1C of the fourth embodiment, the white illuminant 7 is disposed facing the first side surface 31 or the second side surface 32 on at least one end side of both ends of the incident surface 35. The white illuminants 7 are preferably disposed at the respective first side surface 31 and second side surface 32. The backlight device in the fourth embodiment does not require processing of the light guide plate, unlike the second embodiment, and thus can be more easily manufactured. This arrangement allows the white illuminant 7 facing the first side surface 31 on the one end side to easily apply the white light to the side surface on the other end side (the second side surface 32 in the case of the white illuminant 7 disposed on the side of the first side surface 31), thereby enabling more suppression of the color unevenness at the emission surface 33. The outgoing light from the white illuminants 7 can be applied to the vicinity of the ends of the incident surface 35. Thus, the regions in the vicinity of the ends of the incident surface 35 where color unevenness tends to occur can be easily irradiated intensively with the light from the white illuminants 7, which can more surely prevent the occurrence of color unevenness in the vicinity of the ends of the incident surfaces 35.

It is noted that the present invention is not limited to the embodiments mentioned above, and that various modifications and changes can be made to those embodiments without departing from the scope of the present invention.

While, in the above embodiments, the number of white illuminants is two, it may be one. In this case, one white illuminant is disposed on one end side of both ends of the incident surface, which can suppress color unevenness on the one end of the incident surface of the light guide plate. Further, the number of white illuminants may be three or more. In this case, the two white illuminants may be disposed to be positioned on both ends of the incident surface so as to sandwich all the green and red illuminants therebetween. The remaining white illuminant or bodies may be disposed between the green illuminant and the red illuminant.

While, in the above embodiments, both the light emitted from the green illuminant and the light emitted from the red illuminant contain the blue component, either the light from the green illuminant or the light from the red illuminant may contain the blue component.

Specifically, in the embodiments mentioned above, the green illuminant has the blue light emitting element and the green phosphor, and the red illuminant is comprised of the blue light emitting element and the red phosphor. Alternatively, the green illuminant may be comprised of the green light emitting element while the red illuminant may be comprised of the blue light emitting element and the red phosphor. Further, alternatively, the green illuminant may have the blue light emitting element and the green phosphor, while the red illuminant may have the red light emitting element.

In the above embodiments, the light emitting element used in each of the green illuminant and the red illuminant is a blue light emitting element or an ultraviolet light emitting element. However, any light emitting element may be used as long as it is designed to emit light containing a blue component.

In the above embodiments, the optical sheet may further include an optical sheet formed using a quantum nanomaterial. The optical sheet formed using the quantum nanomaterial is, for example, a film sheet formed by diffusing phosphorus-based quantum dots having a green or red emission spectrum into a base of polymers. In the above embodiments, even when the amount of green component or red component is not sufficient in the light emitted from the green illuminant 5 and the red illuminant 6, the provision of the above-mentioned optical sheet at the light guide plate 3 can complement insufficient green or red components, whereby the light in a mixed color can be set close to the white light. In the above description, the optical sheet that complements the green or red is proposed. However, the embodiments are not limited thereto, and may use, for example, an optical sheet that complements blue, other colors, or a combined color thereof.

What is claimed is:

1. A backlight device comprising:
   a case having a first sidewall and a second sidewall opposed to each other;
   a light guide plate having an incident surface, a first side surface, and a second side surface, the first side surface extending from a first end of the incident surface and the second side surface extending from a second end of the incident surface, the light guide plate being located in the case such that the first side surface faces the first sidewall and the second side surface faces the second sidewall;
   a green illuminant disposed facing the incident surface and configured to emit green light toward the incident surface;
   a red illuminant disposed facing the incident surface and configured to emit red light toward the incident surface; and
   a white illuminant disposed on a side of at least one of the first end and the second end of the incident surface and configured to emit white light toward the light guide plate,
   wherein at least one of the green light emitted from the green illuminant and the red light emitted from the red illuminant includes a blue component having an emission peak wavelength in a range of 420 to 500 nm, and
   wherein an inner surface of the first sidewall and an inner surface of the second sidewall are white in color.

2. The backlight device according to claim 1, wherein the white illuminant is disposed facing the incident surface.

3. The backlight device according to claim 1, wherein at least one of the green illuminant and the red illuminant includes a blue light emitting element.

4. The backlight device according to claim 1, wherein the green illuminant, the red illuminant, and the white illuminant are disposed facing the incident surface, and an interval between ends of adjacent illuminants is in a range of 1.3 mm to 3.5 mm.

5. The backlight device according to claim 1, wherein the white illuminant is disposed facing the first side surface or the second side surface.

6. The backlight device according to claim 1, wherein the green illuminant includes at least one green phosphor selected from a group consisting of a β-type sialon-based phosphor, a chlorosilicate-based phosphor, and a LAG-based phosphor.

7. The backlight device according to claim 1, wherein the red illuminant includes at least one red phosphor selected from a group consisting of a CASN-based phosphor, a SCASN-based phosphor, and a KSF phosphor.

8. The backlight device according to claim 1, wherein at least one of the green illuminant and the red illuminant includes an ultraviolet light emitting element.

9. A backlight device comprising:
   a light guide plate having an incident surface, a first side surface, and a second side surface, the first side surface extending from a first end of the incident surface and the second side surface extending from a second end of the incident surface;
   a green illuminant disposed facing the incident surface and configured to emit green light toward the incident surface;
   a red illuminant disposed facing the incident surface and configured to emit red light toward the incident surface; and
   a white illuminant disposed on a side of at least one of the first end and the second end of the incident surface and configured to emit white light toward the light guide plate,
   wherein at least one of the green light emitted from the green illuminant and the red light emitted from the red illuminant includes a blue component having an emission peak wavelength in a range of 420 to 500 nm, and
   wherein at least one of the green illuminant and the red illuminant includes an ultraviolet light emitting element.

10. The backlight device according to claim 9, wherein the white illuminant is disposed facing the incident surface.

11. The backlight device according to claim 9, wherein at least one of the green illuminant and the red illuminant includes a blue light emitting element.

12. The backlight device according to claim 9, wherein the green illuminant, the red illuminant, and the white illuminant are disposed facing the incident surface, and an interval between ends of adjacent illuminants is in a range of 1.3 mm to 3.5 mm.

13. The backlight device according to claim 9, wherein the white illuminant is disposed facing the first side surface or the second side surface.

14. The backlight device according to claim 9, wherein the green illuminant includes at least one green phosphor selected from a group consisting of a β-type sialon-based phosphor, a chlorosilicate-based phosphor, and a LAG-based phosphor.

15. The backlight device according to claim 9, wherein the red illuminant includes at least one red phosphor selected from a group consisting of a CASN-based phosphor, a SCASN-based phosphor, and a KSF phosphor.

* * * * *